(No Model.)
L. S. MANNING.
BASKET CARRIER FOR BICYCLES.
No. 558,879. Patented Apr. 21, 1896.
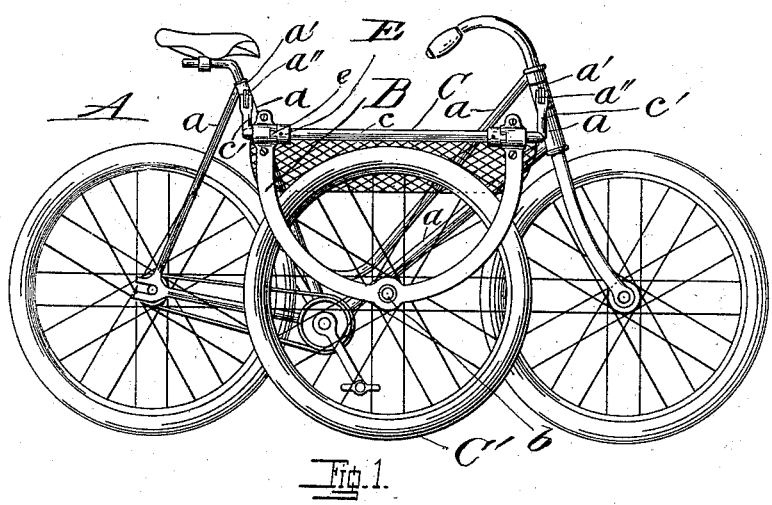
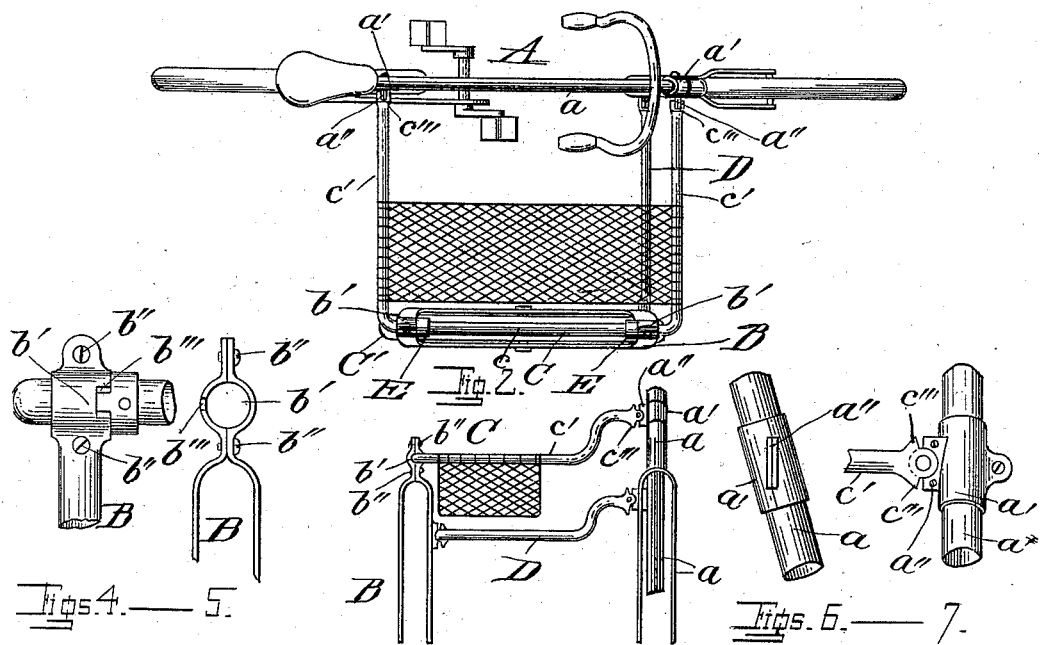
Witnesses
L. F. Hayden
H. L. Keith
Inventor
Lemuel S. Manning
By Attorneys

UNITED STATES PATENT OFFICE.

LEMUEL S. MANNING, OF OAKLAND, CALIFORNIA.

BASKET-CARRIER FOR BICYCLES.

SPECIFICATION forming part of Letters Patent No. 558,879, dated April 21, 1896.

Application filed December 2, 1895. Serial No. 570,846. (No model.)

*To all whom it may concern:*

Be it known that I, LEMUEL S. MANNING, a citizen of the United States of America, and a resident of Oakland, in the county of Alameda and State of California, have made a certain new and useful Basket Attachment for Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for carrying the proper receptacles for merchandise and other articles which it is desired to carry, said receptacles consisting of baskets, tanks, or a seat for a young child, and, indeed, of a receptacle of any character and for any purpose.

The invention consists, primarily, in a certain outrider-wheel and in securing same adjustably to the frame of the bicycle, and, further, in the means whereby the various results are accomplished in a superior manner, the details of all of which will be hereinafter fully specified.

In the accompanying drawings, Figure 1 is a side elevation of a bicycle with this device in position thereon. Fig. 2 is a plan of the device. Fig. 3 is a front elevation thereof with the wheels removed. Fig. 4 is a detail in side elevation of the joint between the horizontal arms and the U-shaped frame for the outrider-wheel. Fig. 5 is an end view thereof. Fig. 6 is a detail of the clip on the bicycle-frame, and Fig. 7 is a view thereof from a point in front of the bicycle.

In the figures like reference-marks are uniformly employed in the designation of corresponding elements of construction.

A is the bicycle, which is composed of the usual frame $a$, which may be of any of the well-known forms of construction so long as there is a proper place for the attachment of the hereinafter-named elements or so many thereof as are necessary to attach this device to the said frame.

B is a U-shaped frame, which is composed, preferably, of two curved bars set parallel and at a sufficient distance apart to receive the wheel C' between them, $b$ being the cone of a ball-bearing for the said wheel, which is secured to both of said bars in any suitable manner. The bars composing the U-shaped frame B may obviously be of any desired form and may be made tubular if it is deemed best; but in the form shown they are made, as before stated, of curved bars, and, also as shown, their upper ends are so bent that when joined they will touch and have formed therein an eye $b'$, as shown best in Figs. 4 and 5, screws $b''$ serving to hold them together. Notches $b'''$ are cut in the end of the cylindrical portion so formed for a purpose hereinafter seen. On the steering-wheel socket and the seat-socket or one of the braces of the frame are clips $a'$, which are made, preferably, in halves and held together by screws in order that the device may be removed from the bicycle when desired, said clips having, on their sides toward the outrider-wheel, lugs $a''$. A bar or pipe C, bent as shown in Figs. 2 and 3 most clearly—that is, having a portion $c$ lying parallel to the frame of the bicycle, preferably, and arms $c'$ at an angle thereto—is connected pivotally by its free ends to the said clips $a$ by means of pins or screws passing through said free ends and through the lugs $a''$ and portion $c$, receiving the openings $b'$ on the upper ends of the U-shaped frame B. Stop-lugs $c'''$ on the upper and lower sides of the free ends of the part C contact with the lugs $a''$ when the said part reaches its upper and lower extremes of movement on the aforesaid pivotal connection. It is now seen that the U-shaped frame B is connected so that it may have movement vertically irrespective of the bicycle, by reason of its being pivotally secured to the bar C and said bar pivotally secured to the frame of the bicycle. In order to preserve the parallelism between the bicycle and the outrider-wheel, an arm D, as best shown in Figs. 2 and 3, is pivotally secured to the frame of the bicycle and to the U-shaped frame B at some convenient points, the securement being effected by the same means as the bar C is secured to the bicycle-frame, preferably, although many other constructions would be adapted to the circumstances.

Between the parts $c'$ of the bar C is suspended the basket, can or cans, or seat, and it may be secured thereto in many equivalent ways, each receptacle requiring, perhaps, an individual means of securement.

In order that the motions of the bar C, and hence of the outrider-wheel, relatively to the bicycle may be limited with certainty without a too great strain on any of the parts, a motion-limiting stop further than the ones hereinbefore described may be provided. This consists in the form shown of a collar E, set on the part $c$ of the bar C and having a tongue $e$ adapted to lie within and contact with the sides of the notch $b''$. The latter at approximately the same time as the lugs $c'''$ contact with the end of the lug $c''$ corresponding therewith.

By unscrewing the clips $a'$ from the frame of the bicycle this device may be easily removed and set aside when it is desired to not use it.

This device may be easily adapted to the collection and distribution of mail-matter and will facilitate same and render the work less laborious.

Having thus described my invention, what I claim as new, and desire to secure by Letters Patent of the United States, is—

In a basket-carrier for bicycles a U-shaped frame, a wheel mounted thereon arms pivotally secured to said U-shaped frame so as to move in a vertical plane, and provided with means for pivotally securing same to bicycle, and a rod pivotally secured to said U-shaped frame, lying out of the plane of said arms but parallel thereto, and provided with means for pivotal attachment to the bicycle and a basket carried between said arms.

In testimony whereof I hereunto affix my signature in presence of two witnesses.

LEMUEL S. MANNING.

Witnesses:
L. R. TURNER,
A. P. WOOD.